United States Patent [19]

Garcia Ramos

[11] 4,187,550

[45] Feb. 5, 1980

[54] MULTIPLE PARAMETER PROCESSING AND PROGRAMMING SYSTEM

[75] Inventor: Jose J. Garcia Ramos, Madrid, Spain

[73] Assignee: Investigacion y Desarrollo de Nuevas Technicas para Automatismo, S.A. (I.D.T.A., S.A.), Madrid, Spain

[21] Appl. No.: 751,373

[22] Filed: Dec. 17, 1976

[30] Foreign Application Priority Data

Jun. 22, 1976 [ES] Spain ................................. 449.123

[51] Int. Cl.² .......................... G06F 15/46; G06F 3/02
[52] U.S. Cl. .................................... 364/900; 364/120
[58] Field of Search ... 364/200 MS File, 900 MS File, 364/101, 104, 105, 108, 111, 118, 120

[56] References Cited

U.S. PATENT DOCUMENTS

| | | | |
|---|---|---|---|
| 3,363,234 | 1/1968 | Erickson | 364/200 |
| 3,440,609 | 4/1969 | Bray | 364/900 |
| 3,509,539 | 4/1970 | Fichten | 364/900 |
| 3,711,837 | 1/1973 | Smith | 364/900 |
| 3,868,648 | 2/1975 | Levin | 364/900 |
| 3,976,981 | 8/1976 | Bowden | 364/900 |

*Primary Examiner*—James D. Thomas
*Attorney, Agent, or Firm*—Wigman & Cohen

[57] ABSTRACT

A programmable multiple parameter process controller is disclosed, which comprises a plurality of programmable units, and functions to monitor the relationship between a pre-selected parameter and a pre-selected value for that parameter and produces a pre-selected output upon the occurrence of the pre-selected condition. The process controller is programmed by the use of at least one keyboard or other input device which initiates at least one pulse generator and a sequence of pulse counters to generate and store a digital signal indicative of the desired programmed value.

29 Claims, 5 Drawing Figures

MULTIPLE PARAMETER PROCESSING AND PROGRAMMING SYSTEM

BACKGROUND OF THE INVENTION

This invention concerns a multiple parameter processing and programming system.

The present state-of-the-art employs systems for connecting or disconnecting signals at various predetermined times or for various values of certain parameters. The operation of a system of this type permits processing and programming of an unlimited number of programming commands which occur within the range of a programmable parameter which has also been previously programmed. An example of a previously proposed system of the type sought to be improved is described in Spanish Patent No. 409,800 and entitled "Improvement of Programmers by Transmission of Multiple Signals" which corresponds to U.S. Pat. No. 3,946,314.

SUMMARY OF THE INVENTION

It is the principal object of the present invention to provide a multiple parameter and programming system which improves previous techniques with respect to speed of response, memory capacity and versatility, the system employing a set of more modern and rapid components.

The present system is basically a programmable process controller which has provision for selecting from a plurality of programmable units by the use of various input devices, for example, a push-button keyboard, punched cards, magnetic tape and the like. The controller contains at least one pulse generator, a plurality of counters, and means, such as pulse counter modules, for sequentially connecting the plurality of counters to the pulse generator. The pulse generator produces a plurality of pulses of different amplitudes which are received by the counter connected to it which counts these pulses. A comparator is connected in such a manner that it will deactivate the pulse generator upon determining that the counter then connected to the pulse generator contains a value corresponding to the input to the controller produced by the input device, for example, the value of a depressed push-button of the keyboard. Each of the programmable units contain directional units, which are programmed in a similar manner as the counter described above, and also pulse counter modules to ensure the proper sequencing of programming of the directional units and other counters within each programmable unit addressed by the controller.

BRIEF DESCRIPTION OF THE DRAWINGS

The advantages and details of the present invention are to become evident during the course of the description hereinbelow which begins with an explanation of the accompanying figures of drawings which illustrate respective portions of an illustrative, preferred embodiment of a system according to the present invention in which.

DETAILED DESCRIPTION OF PREFERRED EMBODIMENT

Figure 1:
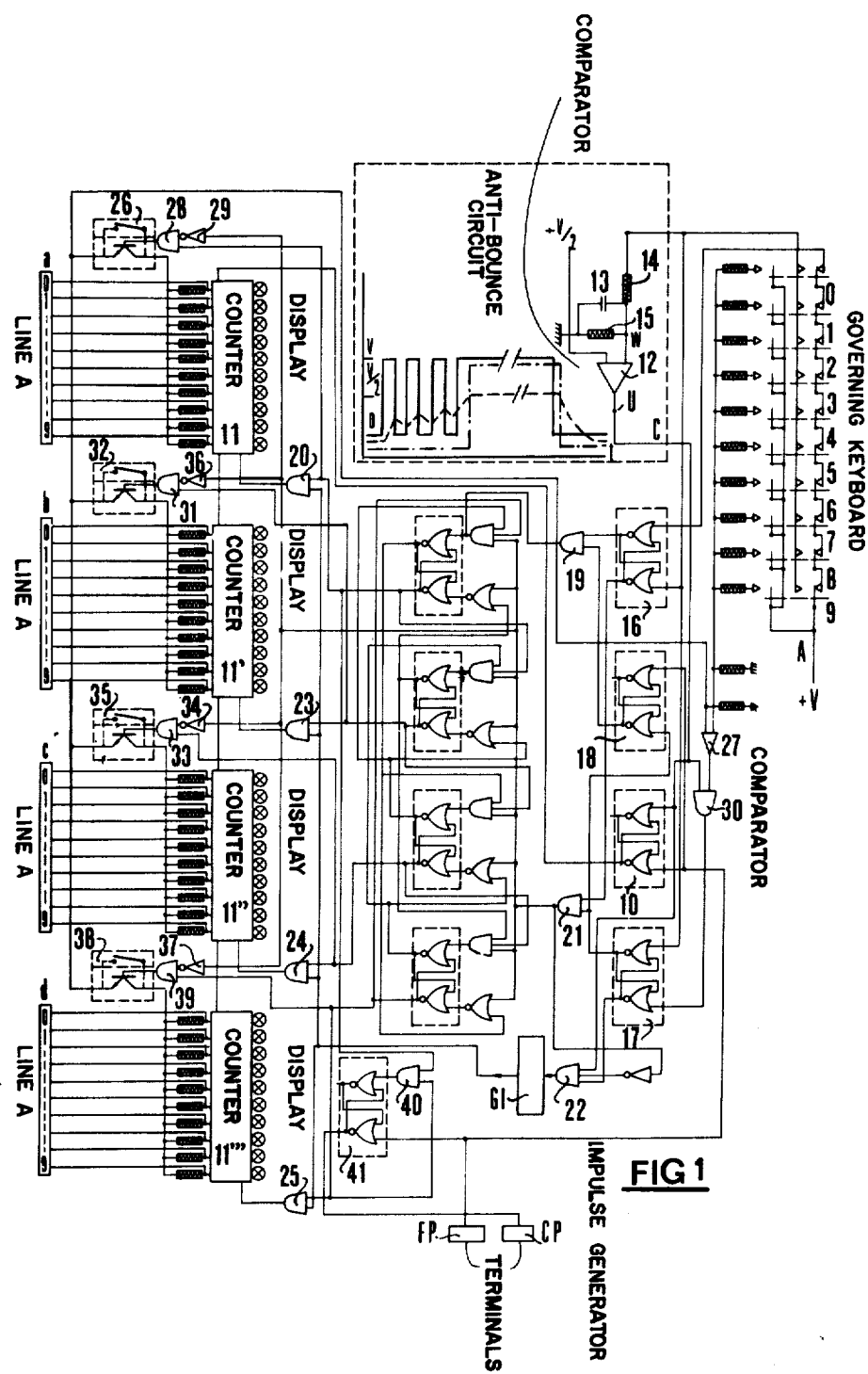
FIG. 1 is a schematic diagram of a switching circuit.

The meanings for selected symbols appearing in FIGS. 1-5 are as follows:
FP means end programming;
CP means begin programming;
TPV means no-load programming outlet;
NP means programmed level;
SP means program output;
S1 means output number 1;
S2 means output number 2;
D means deactivated connection;
ED means digital input;
SD means digital output;
EI means pulse input;
UDP designates direction unit;
DUD designates deactivated directional unit;
AI means initial actuation;
IUD designates pulse input to directional unit;
FPV indicates end of no-load programming;
A designates power supply;
$SD_o$ means end-of-program signal;
0.3 means commands; and
P.3 means parameters.

Instructions for programming a series of commands for a series of values of different parameters is given below.

First of all, a ten-button keyboard A (see FIG. 1) is used to select the number of the memory unit which is to be employed. This number will be displayed on a screen throughout the programming procedure.

In the second place, the pulse keyboard B (see FIG. 3) is used to select the value of the parameter which is to be employed and which is to produce the desired command. This value of parameter is fed into the machine by expressing it directly in the decimal system, first indicating the digit in the column of highest magnitude, then the digit in column of magnitude just below that of the first digit, and so on, until the entire number has been read into the machine. (For example, the order of introduction of the digits of numbers 1729 would be first the digit 1, then the digit 7, then the digit 2 and finally the digit 9.) Examples of quantities that may be fed to the machine are: 840.4 degrees Centigrade; 22 hours, 13 minutes; 10.24 atmospheres, and the like. Following this action, the next step is to feed into the machine a digit which will either have an effect on the processing or will simply be a signal input that will have no effect on the normal procedure. As an example, let us say that the digit "0" shall indicate that the value of the parameter selected shall not represent a fixed value of this parameter but rather a minimum value (a floor) below which the parameter value shall not descend in any case. If a value of this parameter lower than the determined value does appear during the processing, a command will be given to increase this low value to the programmed minimum value. The digit "1" shall indicate, in this example, that the value of the parameter will be represented EXACTLY. Therefore, a signal will always be obtained during processing indicating that the EXACT programmed value will be used. Similarly, digit "2" would indicate that the programmed value of the parameter shall constitute a maximum value. Consequently, a programmed command will ensure that the value of this parameter never exceeds that preset as the maximum value.

Figure 3:
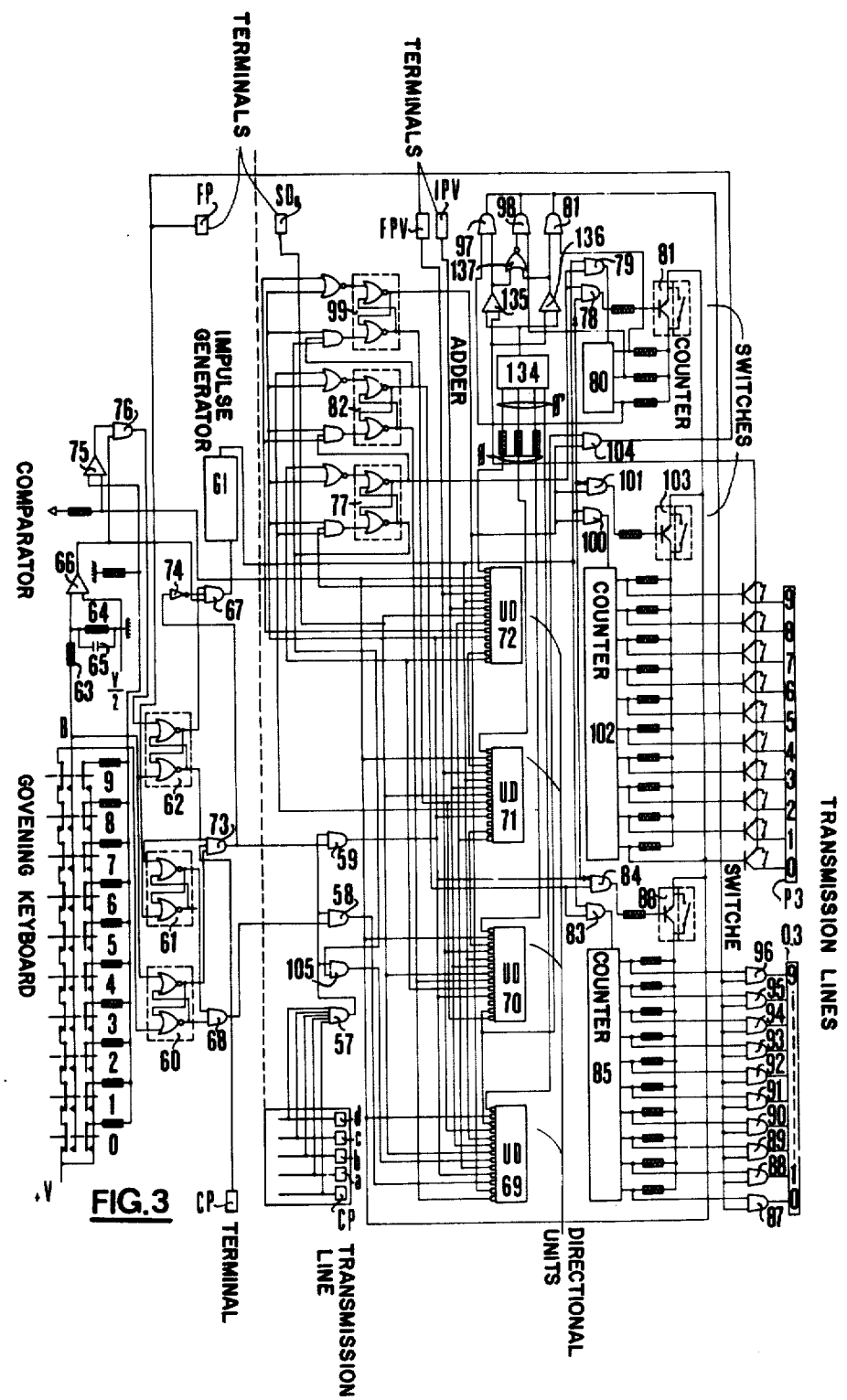
FIG. 3 is a schematic diagram of a programming unit.

In the third place, still using the same keyboard B shown in FIG. 3, the response which is desired that the memory unit give is selected. This is done by simply pressing the key for the desired number of this keyboard. In this manner, the response each memory unit is to supply in answer to a given stimulus is selected. These responses may be of any type ranging from direct intervention in the processing such as increasing or decreasing a given parameter (length, temperature, pressure, velocity, acceleration, etc.) to responses which do not involve direct intervention in normal processing. Examples of the latter type of response are calling attention, stop, start, record data, and the like.

In the fourth place, once an operator has selected the response wanted from each memory unit to emit, he will use the same keyboard (B, which is shown in FIG. 3) to select the parameter which one is to control. As in the previous cases, one accomplishes this by pressing the number that corresponds to the parameter which one would like to have controlled by this programming unit.

Therefore, noting that with two keyboards, each containing 10 keys, one first selects the number of the memory unit to which he wishes to have access (keyboard A, FIG. 1). Using the other keyboard (keyboard B of FIG. 3), one first selects a value for a given parameter X. One then informs the system as to whether this value shall constitute a maximum, minimum or absolute value. Then, one informs the system of the number of the memory unit which was selected in the first step of this procedure, of the response that this memory unit is to supply and finally precise identification is made of the parameter which was previously called "X".

It is to be appreciated, at this point that, so far, reference has been principally to keyboards. Nevertheless, programming may be performed with the use of punched cards, magnetic tape, memory discs, as well as with other conventional means and techniques.

Before going on to a description of these processes in greater detail, one is to make a distinction between the two main types of techniques which are to be described below and which simply constitutes an expansion of the explanations furnished with regard to the various components of the techniques dealt with in the aforementioned Spanish Pat. No. 409,800 and U.S. Pat. No. 3,946,314. This distinction refers to the types of processes or commands which can be classified into two groups. The first group of processes includes those which require commands that do not have to be repeated often within each cycle. Therefore, this first group includes those commands which are not repeated, those which are repeated in a given sequence or those which are not often repeated. The second group contains those processes which require much repetition of commands. Commands of the first group are to be firstly considered.

It can be seen from the foregoing test, that the first step is to select the number of the programming unit which is to be actuated. This selection is made by means of a keyboard A (see FIG. 1). In order to spell out the number of the programming unit that is to be employed, one first presses the key that corresponds to the digit in the column of highest order of magnitude and follow this action by pressing the other keys in order of decreasing magnitude of column (from left to right of number). In the case described above (FIG. 1), one is dealing with an apparatus containing 10,000 programming units. Consequently, one first presses the digit in the thousandths place, then the one in the hundredths place, then the one in the tens place and finally the digit in the units place. The manner in which the circuit performs this selection is the following: When the flip-flop 10 in FIG. 1 is deactivated by the preceding program, the counters for decades 11, 11', 11" and 11''' are cut off from the power supply so that no signal is available at output points a, b, c, and d. Let one suppose, for example, that a user is going to operate on memory unit number 8,423. We first press the key marked "8", thus sending a signal to circuit C of FIG. 1. The purpose of circuit C is to avoid having the current transients, which are produced by bouncing of the key contacts, transmitted to the other components of the system. Located immediately below circuit C, there is a diagram showing the various values of voltage with respect to ground of the various points in this circuit. One observes that by means of comparator 12, capacitor 13 and resistors 14 and 15, transients due to key contact bouncing are eliminated from the rest of the system circuitry. It is to be understood that this portion of the system is simply used as an example of how to avoid the effects of contact bounce. Actually, this portion of the system could be replaced by some other sub-system or else by conventional electronic switches, thus eliminating the bounce problem. In this diagram, the solid line connects the points whose potential has a value X, the line of dashes connects points whose potential is W and the line consisting of dots and dashes indicates those points with a potential of U.

The same signal that is sent to the anti-bounce circuit is also transmitted to flip-flop 16, turning it off and, in turn, turning on flip-flop 17. Therefore, it is to be kept in mind that flip-flop 18 was in the "ON" state since the last program, it remains in the "ON" condition, and the signal is present at the output indicated to the right of flip-flop 18.

Figure 5:
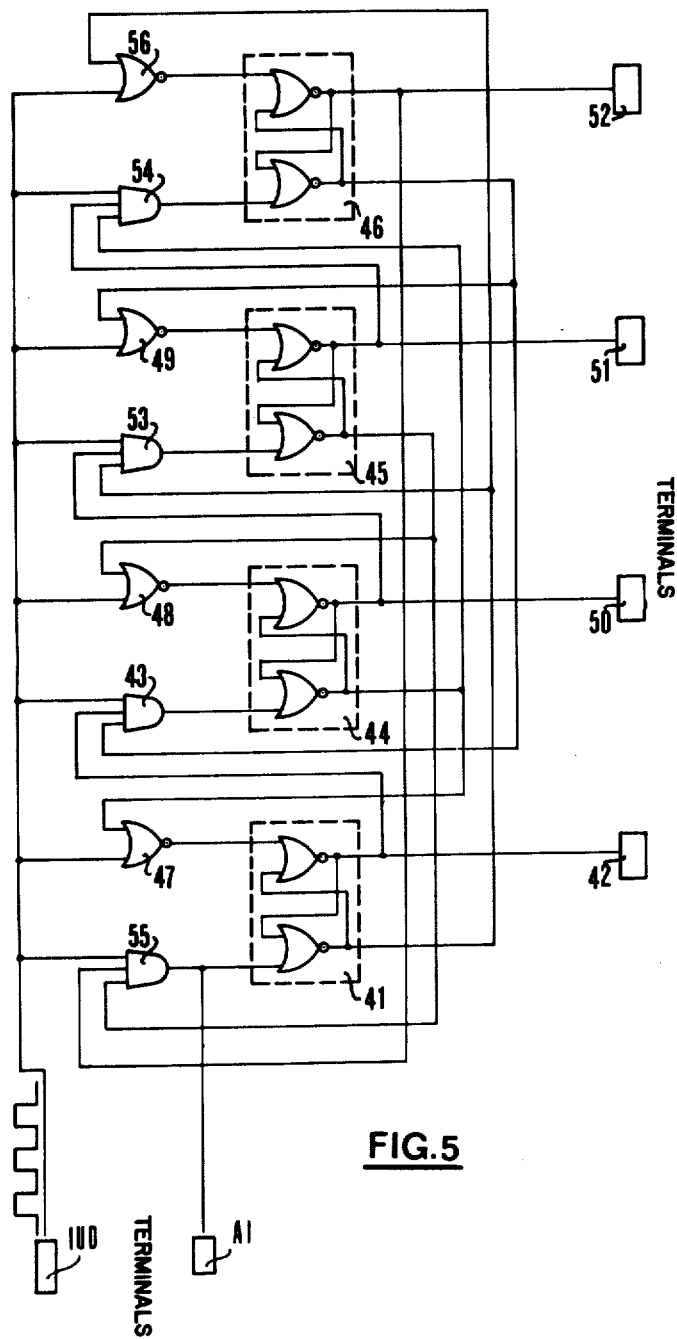
FIG. 5 is a schematic diagram of a pulse counter module.

With respect to the states of the aforementioned flip-flops, one observes that there is a signal present at both inputs to logic gate "Y" 19, so that one has activated the first module contained (in this particular case) in the pulse counter module which is located immediately below the three logic gates "Y" that are, in turn, located below the abovementioned flip-flops. Operation of this pulse counter module is shown in the diagram of FIG. 5. Its aim and effect is to cause the programming to proceed from one decade counter to another, provided that the programming in the preceding decade counter has already terminated.

When the first module of the modular pulse counter is actuated, there will be a signal present at "Y" logic gate 20. On the other hand, if flip-flop 17 is actuated, if there is a signal at the "U" output of the anti-bounce circuit and if there is no signal at the output of "Y" logic gate 21 (due to activation of flip-flop 17 and deactivation of flip-flop 16), there is a signal present at the output of "Y" logic gate 22, thus starting operation of the pulse generator (G1 of FIG. 1). These pulses will enter one of the inputs of "Y" logic gates 20, 23, 24 and 25. Since the other required signal was already present at "Y" logic gate 20, these pulses will continue on to counter 11 which, unless reset to zero, will continue conducting the signals cyclically through its 10 outputs. Each of these signals passes through a resistor and creates a series of voltages at each of these ten points. These voltages occur cyclically at the following voltages and in the following sequence: 1 volt, 2 volts, 3 volts, 4 volts, 5, volts, 6 volts, 7 volts, 8 volts, 9 volts, 10 volts, 1 volt, 2, volts, 3 volts, 4 volts, and so on. These voltages are impressed at a common connection point by means of switch 26 and enter comparator 27. Switch 26 is closed due to the fact that a signal is present at the output of gate 28 since the first module of the modular pulse counter is activated and since a signal is present at the output of the "NO" logic gate 29. (The signal is present at the output of the latter gate due to the fact that there is no signal present at the output of gate 21).

Furthermore, in addition to transmitting a series of voltage steps to comparator 27, a voltage is sent to the other input of comparator 27 by pressing key number 8 of keyboard A of FIG. 1. When the voltage level issuing from counter 11 is equal to that transmitted by pressing key number 8, a signal is produced at the output of comparator 27 and therefore at the input of gate 30 as well. When gate 30 receives a signal at its other input (which comes from comparator 12), it deactivates flip-flop 17, deactivating the pulse generator in turn. In this manner, decade counter 11 maintains a signal at output number 8 of output group A and also indicates on the screen that this counter has selected number 8 (this screen) in any type of operation shown in FIG. 1 by the encircled crosses for counters 11, 11', 11" and 11'''.

Therefore, while switch number 8 is kept depressed, it will keep the flip-flop deactivated, flip-flop 18 being deactivated (since flip-flop 17 is deactivated and flip-flop 10 is activated). The first module of the modular pulse counter is also activated. The entire system will remain in this condition until switch key 8 is released.

Upon releasing key 8 (of keyboard A, FIG. 1), flip-flop 16 is activated. Consequently, the two required signals will be present at the input to gate 21, thus impressing a signal at its output and activating the second module of the modular pulse counter. This assumes that the two signals formerly existing at the inputs to gate 20 no longer are there. It is also assumed that the two signals formerly present at the inputs to gate 28 have disappeared. Therefore, switch 26 opens up. Following this, switch number 4 is actuated, thus deactivating flip-flop 16 and impressing one of the signals at the input of logic gate 19. However, the other signal is not present since flip-flop 18 is deactivated. Therefore, when flip-flop 16 is deactivated, gate number 21 is also deactivated. As a result, only the second module of the modular pulse counter will be activated at this time. When key number 4 is pressed, flip-flop number 17 is also activated. Therefore, once there is a signal present at the output of comparator 12 (after the effects of contact bounce have been eliminated), the pulse generator will again start operating due to activation of the output of gate number 22. When one of the inputs to gate 23 is activated, these pulses will be fed to decade counter 11'. Module number 2 of the modular pulse counter will in turn activate gate number 31 (since gate 21 is also deactivated), thus closing switch 32. This will cause the series of voltage steps generated by modular pulse counter 11' to be impressed on the inputs of comparator 27. Simultaneously, this comparator receives a voltage pulse of a given amplitude when key number 4 is actuated. When these two voltages (the one coming from decade counter 11' and the one coming from keyboard A of FIG. 1) are equal, a signal will appear at the input to gate number 30. This signal, together with the one coming from comparator 12, deactivates flip-flop 17, thus stopping the pulse generator and deactivating flip-flop 18 (although it had already been deactivated since the previous operation). All of the foregoing steps terminate in the production of a steady signal at output 4 of the decade counter 11' as well as the appearance on the display screen of number 4 following the number 8.

Upon releasing key number 4 which had been pressed, flip-flop 16 is activated which impresses a signal at the input to gate 21. Since there is also a signal at the other input to this gate which is produced by the deactivation of flip-flop 17, this gate will send a new pulse to the modular pulse counter. During the time that no key is depressed, the second and third modules of this counter will be activated. However, when key number 2 is pressed again, flip-flop number 16 will be deactivated and flip-flop 17 will be activated, thus removing the signal from the output of gate 21. This action will leave only the third module of the modular pulse counter activated. This means that there will be a signal present at the input to gate 24. When the pulse generator starts operating, the pulses will pass through gate number 24 and on to decade counter 11". The pulse generator has again begun operating since there are various pulses present at the three inputs to gate number 22, these pulses having resulted from the activation of flip-flop 17, from the deactivation of gate number 21 and from the signal coming from comparator 12. Activation of the third module of the modular pulse counter, in addition to activating gate number 24, also activates gate number 33, since there is no longer any signal at the output of gate 21 (which is therefore present at the output of gate number 34). Activation of gate number 33 causes the closing of switch number 35, thus sending a series of voltage steps that is generated by the decade counter 11" to one of the inputs of comparator 27. When key number 2 is pressed, the resulting voltage pulse is impressed upon the other input of comparator 27. When the pulse levels at both inputs of comparator 27 are equal, a pulse is produced at its output which results in deactivation of flip-flop 17, thus stopping the pulse generator and leaving a signal present at output number 2 of output group c of counter 11". This action also causes number 2 to appear on the display screen alongside numbers 8 and 4.

Deactivation of flip-flop number 17 results in the deactivation of flip-flop number 18 and the appearance of a signal at one of the inputs to gate number 21.

When key number 2 is released, flip-flop number 16 is reactivated, resulting in the appearance of the other signal which had been missing at the input to gate number 21. This means that the modular pulse counter receives a new pulse which activates the third and fourth modules as well as causing these pulses to appear at the output of gate number 21. Thus there will be no signals present at the outputs of gates 29, 36, 34 and 37, consequently keeping switches 26, 32, 35 and 38 open.

When key number 3 is depressed, flip-flop number 16 is deactivated and flip-flop number 17 is activated. Deactivation of flip-flop number 16 causes one of the input signals to gate number 21 to disappear, thus eliminating the output signal of this gate, leaving only the forth module of the modular pulse counter activated. This also activates gates numbers 25 and 39, thus closing switch 38.

When gate number 22 has the three signals at its inputs coming from comparator 12, from the activation of flip-flop 17 and from deactivation of gate number 21, a signal appears at its output which starts the pulse generator. These pulses will pass through gate number 25 to decade counter 11''', which since switch 38 is closed, sends the train of voltage steps to one of the inputs of comparator 27 which, in turn, will receive a voltage pulse at its other input that is generated by depressing key number 3. When these two levels are equal and by the same procedure explained in the previous cases, the pulse generator will be stopped by deactivation of flip-flop number 17. Therefore decade counter 11''' will have a signal present at output number 3 of output group d. This will cause the appearance on the display screen of the complete number of the programming unit to which we are seeking access, which is exactly 8,423. This number will remain on the screen during the entire time that programming by this programming unit is being performed, that is, during the entire time that decade counters 11, 11', 11'' and 11''' are being fed power, that is, during the entire time that flip-flop number 10 is activated.

Releasing key number 3 activates flip-flop 16 which generates a signal at the input to gate 21. This signal, together with the other one that is generated by deactivation of flip-flop number 17, produces a signal at the output of gate number 21. Since a new pulse has been sent to the modular pulse counter, this means that the first and fourth modules will be activated. Therefore, there will be two signals at the input to gate 40, thus activating flip-flop number 41. Consequently, there will be generated a pulse whose duration is equal to the total programming time at terminal CP. This pulse determines that the programming unit has been established and that programming can begin at this time.

Beginning at this moment, activation of programming unit 8,423 begins. This means that all data that are introduced into the system from now on by keyboard B of FIG. 3 will constitute the complete programming for this programming unit in the following order: The first digit represents the unit of highest order which defines the target value of the parameter for which determination of the order to be produced is desired. The succeeding pulsed digits, which are always in decreasing order and vary in numbers, in accordance with the capacity of each programming unit, completes the target value of the parameter concerned. Once this target value of parameter is completed, the following digit to be generated is determined as follows. The digit "zero" means that this programmed value is a minimum, digit "1" means that it is the exact value and digit "2" means that this value is a maximum. The digits which are subsequently generated determine the response that it is desired for this programming unit to furnish to a given stimulus. This response may be, for example, increasing or decreasing a variable, calling attention to some other type of signal.

Finally, the digits which are generated from this time on will determine the number of the parameter which is to be selected, that is, that whatever has been programmed as a response to this program may occur for a given programmed value of the parameter which is not being selected, for example, temperature, pressure, velocity, length, time, degree of luminosity, concentration, and the like.

Before describing the method of conducting this programming procedure, the principles of operation of the modular pulse counter is to be explained. The purpose of this counter is to cause the programming to pass from one module to the next in the same direction, provided that the programming in the previous module has been terminated. Operation takes place as follows: First of all, the first module (see FIG. 5) is activated by means of pulses sent through input AI. This pulse activates flip-flop 41, which produces a signal at output 42 simultaneously with a signal at gate 43. Flip-flop numbers 44, 45 and 46 are in the deactivated state which means that signals exist at gates 47, 48 and 49 and that no signal exists at outputs 50, 51 and 52, so that only the first module is activated (output 42). Since flip-flop 46 is deactivated, two of the three necessary signals are available at the input to gate 43, so that, at the moment that a pulse arrives at the input marked IUD, gate 43 will have three pulses at its input, so that the flip-flop numbers 41 and 44 will be activated at this time. Activation of flip-flop 44 eliminates the signal which existed at the right input to gate 47 while a signal simultaneously appears at one of the inputs to gate 53. When this pulse at the input to gate 47 disappears, there will no longer be a signal present. Therefore, there will be signal present at the output of this gate which will deactivate flip-flop number 41. Once the pulse has disappeared, only the second module will remain activated. Therefore, there will only be a signal present at output 50. It will be observed that there are now two signals present at the input to gate number 53. Therefore, when a second pulse arrives at input IUD, gate 53 will receive it, thus activating flip-flop number 45. At this time and throughout the duration of the pulse, flip-flops 44 and 45 remain activated. This means that the second and third modules are activated. At this time, gates 47 and 48 also do not have signals present at their inputs at the terminal shown at the right. This means that when this second pulse stops, flip-flops 41 and 44 will be deactivated. (It should be pointed out that flip-flop number 41 was already deactivated due to the previous operation).

At this time, flip-flop number 45 is activated. Thus the third module will have a signal present at output 51 and two signals at the input to gate number 54. This means that when another pulse arrives at IUD, it will be impressed on the output of gate number 54, activating flip-flop number 46 and keeping flip-flops 45 and 46 activated throughout the duration of the pulse. This means that the third and fourth modules will be activated throughout this period. When flip-flop number 46 is activated, the signal at the input to gate number 49 no longer exists. Therefore, when the pulse received terminates, there will be a signal present at the outputs to gates 48 and 49. This signal will cause the gates to deactivate flip-flops 44 and 45 respectively. (Flip-flop 44 had already been deactivated by the previous operation). Therefore, only flip-flop 46 (and consequently the fourth module) remains activated.

Due to activation of flip-flop number 46, two signals will be present at the input to gate number 45. Consequently, the succeeding pulse will be received by gate number 55 and will activate flip-flop 41, thus activating the first and fourth modules and producing signals at outputs 42 and 52. Activation of flip-flop 41 clears the inputs to gates 56 and 49 of the signals. Therefore, when this pulse disappears, a signal is present at the outputs of gates 49 and 56 which will deactivate flip-flops 45 and 46 respectively. (Flip-flop number 45 had already been deactivated during the previous operation). Therefore, at this time, only flip-flop number 41 (and therefore the first module) is activated, so that the cycle will be repeated in similar fashion.

Having described above the principles of operation of the selector system and of the modular pulse counter, the offset and action of these components on the programming units are to be considered. The selector circuit shown in FIG. 1 chooses a given memory unit. This process of selection is performed by means of gate number 57. As can be seen from FIG. 3, the inputs to gate number 57 are connected to a given number of output groups a, b, c and d in addition to the connection of FIG. 1, called CP (commence programming). In the example described herein, this programming unit will be 8,423 so that terminals "a" will be connected to terminal 8. Similarly, the outputs of group "b" will be connected to terminal 4, the outputs of group "c" will be connected to terminal 2 and the outputs of group "d" will be connected to terminal 3. Therefore, when this gate 57 receives the signals coming from these connections in addition to the signal issuing from terminal CP (this means that the process of selection has ended and that programming may begin) a signal will be impressed upon the input of gate number 57 and therefore a signal will be introduced at one of the inputs 58, 59 or 105.

Having made the selection and activated the appropriate programming unit, the only thing that remains to be done is to introduce the programming data into the system by means of keyboard B of FIG. 3.

Before explaining this programming process, the composition of the complete programming unit which is employed as an example for explaining the principles of operation of the system is to be defined. In this case (see FIG. 3), the programming unit consists of 4 directional units (their operation is to be explained below) and 3 counting modules, which together with the 4 modules that are located within the directional units (one module in each unit), forms a modular counter consisting of 7 modules. Furthermore, this programming unit contains two decade counters and a 3-signal counter. Having specified the groups of components present in this programming unit, the principles of operation are explained as follows:

Flip-flops 60 and 61 are in the activated (or ON) state. Flip-flop number 60 is activated since no key has been pressed. Flip-flop number 61 is activated since a previous program had previously existed, leaving this flip-flop in the activated position. As we mentioned previously, the first thing is set the digit of highest order (the leftmost digit) which determines the value of parameter for which the production of a given order is desired. Following this step, all of the other digits representing the value of this parameter are set in decreasing order. In the particular case which is described here, each programming unit consists of 4 directional units. This permits having 10,000 possible actuations of the programming unit for each cycle ($10^n$, where n is the number of associated directional units). Therefore, it will be necessary to set 4 digits to determine the value of the parameter. Assuming that this value is 973.4, this program will begin by pressing the button marked "9". Performing this operation will result in sending a signal to flip-flop number 62, activating it and simultaneously deactivating flip-flop number 61, activating it and simultaneously deactivating flip-flop number 60. Performance of the aforementioned operation will also result in sending a signal to comparator 66, to resistor 64 and to capacitor 65. This circuit, which consists of comparator 66, resistors 63 and 64 and capacitor 65, is designed to avoid the transients produced by bouncing of the switch contacts in the keyboard as was explained in the description of this system which is shown in FIG. 1.

When flip-flop number 62 is activated, a signal appears at the input to gate number 67. When flip-flop number 61 is activated, a signal is impressed upon the input to gate number 68. The latter signal, together with the one generated due to the deactivation of flip-flop number 60, generates a signal at the output of gate number 68. The latter signal appears, in turn, at one of the inputs of gate number 58. (Gate 58 already had its other input activated due to activation of gate 57). Consequently, the signal from gate number 58 reaches the third input of directional unit number 69. This third input is intended to activate the first module of the modular pulse counter (with input AI of FIG. 5). In this manner, the first directional unit is activated.

Furthermore, when the two signals are not present at the input to gate number 73, they are not present either at the input to gate number 59. However, they are present at the input to gate number 67 where they arrive by way of gate number 74. Therefore, at the instant that the missing signal (which is to come from comparator 66 when the contact bouncing effect has been eliminated) appears, there will be a signal present at the output of gate number 67 which will start operation of the pulse generator GI. These pulses will be impressed upon the directional units and upon the three counters located within the programming unit. However, these pulses will only be accepted by the first directional unit since only the first module of the modular pulse counter has been activated.

During the programming of the first directional unit, the output for the programmed voltage steps (output NP) will be open-circuited. However, activated directional unit 69 contains a voltage step generator whose output SP goes through a common junction, impressing the voltage on comparator 75. This comparator has another input through which it receives a voltage pulse that is originated by pressing key number 9. At the instant that these two voltage levels are equal, a signal appears at the output to comparator 75. This signal, which is the last of those required for the following action, is impressed upon the input to gate number 76 so that the output signal from this gate deactivates flip-flop 62. The resulting signal, which is impressed upon gate 67, disconnects the output of the pulse generator and also introduced a signal at the input to gate 73. This deactivates the flip-flop, thus eliminating one of signals from gate number 68.

In the aforementioned manner, the signal which came from gate number 58 and activated the first module of the modular pulse counter has been eliminated. Moreover, the pulse generator has been stopped so that we have managed to program directional unit 69 for a given voltage level or for its equivalent, a given digital input. Once the first directional unit has been programmed (this fact being made known by a reading of the system itself after setting the pulse generator), key number 9 is released. This action activates flip-flop number 60, resulting in the presence of two signals at the input to gate number 73. (The first signal had already been present due to the deactivation of flip-flop number 62). The signal obtained at the output of gate number 73 by way of gate number 59 (provided that number 37 is activated) supplies a pulse to the modular pulse counter which activates the first and second modules, as has been previously observed. The next step is to press key number 7. When this is done, flip-flop number 62 is activated and number 60 is deactivated. This action eliminates the signals which had been present at the input to gate number 73, thus interrupting the pulse which had been sent to the modular pulse counter. This leaves only the second module of the modular pulse counter (and therefore directional unit number 70) activated. Consequently, directional unit number 70 will, in turn, transmit a series of voltage steps to comparator 75 (these voltage steps being generated by the pulse generator) since gate number 67 has been activated. These voltage steps are received only by directional unit number 70. (The principles of operation of the directional units, whose schematic diagrams are supplied herein, will be explained in greater detail further on during the description of FIG. 2).

At the instant that the series of voltage steps transmitted by unit 70 reaches the same level of voltage as that transmitted by key B of FIG. 3 when key number 7 is pressed, the comparator furnishes a signal at its output. This signal passes through gate number 76. Provided that the contact bouncing of the key has been eliminated, the signal from gate number 76 deactivates flip-flop number 72. In turn, flip-flop number 72 deactivates flip-flop number 61—that is, it sends a signal to deactivate flip-flop number 61 although the latter has previously been activated by other means. This deactivation of flip-flop number 72 stops the operation of the pulse generator by means of gate number 67 so that, at that moment, the directional unit 70 is programmed at a given voltage level or receiving a pulse for a given digital input. Thus, we have already programmed the first two digits which determine the value of the parameter for which it is desired that the programming unit produce a given signal.

Since the programming for the digit "7" has been concluded the corresponding key on the keyboard is now released. This motion again activates flip-flop number 60, thus providing the two necessary signals at the input of gate number 73. (The other signal is furnished by the deactivation of flip-flop number 62). A signal is thus transmitted by gate number 73 to the input of gate number 59. Since there is a signal at the other input to gate number 59 (which is due to activation of gate number 57), gate 59 sends a new pulse to the modular pulse counter. Thus, we have the second and third modules of modular pulse counter, which are included in directional units 70 and 71 respectively, activated at this time. At this moment, the key marked number 3 on the keyboard is depressed, sending a signal that activates flip-flop number 62 and deactivates flip-flop number 60. This action deactivates gate number 73, interrupting the signal being sent to the modular pulse counter. This leaves only the third module of the aforementioned counter, and therefore the third directional unit (directional unit number 71) activated. On the other hand, the deactivation of gate number 73, the activation of flip-flop number 62 and the elimination of the effects of switch contact bounce all act to produce activation of gate number 67 and consequently start the pulse generator. These pulses which pass through a junction of all the programmable groups that exist in each unit and in fact of all the programming units are accepted only by directional unit 71. Therefore, this unit will begin to transmit a series of voltage steps in cyclical order. These voltages will enter the comparator number 75. As in the preceding cases, when this voltage is equal to that coming from keyboard B (FIG. 3) in response to actuation of key number 3, a signal will be produced at the output of comparator number 75, which by means of gate number 76, will deactivate flip-flop number 62, stopping the generation of pulses. At this moment, the third directional unit is programmed. Releasing key number 3 of the keyboard activates flip-flop number 60.

Thus, the two required signals now exist at the input to gate number 73. This results in production of a signal at the output of gate 73, which is transmitted again by way of gate number 59 and, provided that number 57 is activated, sends a pulse to the modular pulse counter. Therefore, at this stage, the third and fourth modules of the modular pulse counter are now being activated.

At this instant, the first 3 digits that determine the value of the parameter which is to be programmed have been programmed. The only step left to be taken is to depress key number 4 on the keyboard. In this manner, flip-flop number 62 is reactivated and flip-flop number 60 is deactivated, thus deactivating gates 63 and 59 and interrupting the signal being transmitted to the modular pulse counter. Therefore, only the fourth module of this modular pulse counter remains activated. This means that, at this time, only the fourth directional unit (directional unit number 72) remains activated. As in the previous procedure and due to the activation of gate number 67, the pulse generator is restarted, sending pulses throughout the entire system. However, these pulses will be accepted only by directional unit number 72, which will repeat the procedure previously explained for the other units, that is, it will transmit 10 voltage steps in cyclical order to comparator number 75. When one of these voltage steps coincides in amplitude with the voltage coming from keyboard B (FIG. 3), comparator number 75 will stop operation of the pulse generator, thus leaving directional unit number 72 programmed for the value 4 which will correspond to voltage step number 4 as well as to digital input number 4. Releasing key number 4 activates flip-flop number 60, which activates gate number 73 (since flip-flop number 62 has been deactivated). This gate (number 73) sends a new signal by way of number 59 to the modular pulse counter, thus activating the fourth and fifth modules (of the seven which compose the modular pulse counter).

At this stage, programming of the target value of the parameter has been completed and we proceed to the second phase of the programming procedure which consists in programming a conditional value to determine whether the target value which was previously selected is a maximum, minimum or exact value (digits 0, 1 or 2). Let us assume that we wish to have the value of 973.4, which we programmed before, correspond to a maximum value. To accomplish this, we press key number 0, thus activating flip-flop number 62 and deactivating flip-flop number 60. This will result in deactivating gate number 73 and will interrupt the signal transmitted to the modular pulse counter. Thus, only module number 5 of the 7 modules composing the modular pulse counter will remain active at this time. Said activation of module number 5 results in activation of flip-flop number 77, thus producing a signal at one of the inputs to gates 78 and 79. Due to activation of flip-flop 62, deactivation of gate number 73 and the elimination of the effects of contact bounce, gate number 67 is activated and starts the pulse generator which will send the pulses circulating throughout the entire system. However, these pulses will only pass through activated gate number 70 to counter 80 which, by means of switch number 81 and assuming that gate number 78 has been activated, will transmit three voltage steps cyclically to comparator number 75. (Gate number 78 is in the activated state when number 59 is deactivated and flip-flop number 77 is activated). As in previous cases, when one of these three voltage steps coincides in comparator 75 with the voltage step coming from keyboard B (FIG. 3) upon pushing key number 0, a signal will be produced at the output of said comparator 75. This will deactivate flip-flop number 62, thus stopping operation of the pulse generator and producing a signal at the third output of counter 80. This signal is present at one of the inputs of gate number 81 which corresponds to programming of a maximum. At this instant, the key numbered "zero" is released, thus activating flip-flop number 60 and gate number 63. The latter transmits a signal, by activating number 59, to the modular pulse counter, thus activating the fifth and sixth modules of this counter, or flip-flops 77 and 82.

The system as used thus far has been provided with an indication of a numerical value and the fact that this numerical value is a maximum value. In other words, the system has been given a stimulus to which it must respond. It must now be indicated what response is desired in answer to this stimulus. This response will be indicated by means of the digit or digits which are pulsed sequentially. (In the case being described, there are 10 different orders. Therefore, a single digit will be sufficient to indicate which response is desired from this programming unit). This does not mean that the number of responses is limited to 10 but that any number of responses may be obtained by expressing them with the necessary number of digits.

A program is to be provided in programming unit number 8,423 which, when a parameter that is to be determined later on reaches a value greater than 973.4, will give the response number 6. Therefore, key 6 of keyboard B (FIG. 3) is pressed. By so doing, gates 73 and 59 are deactivated, thus interrupting the signal transmitted to the modular pulse counter. Therefore, only module number 6 or flip-flop number 82 remains activated, thus sending a signal to gates 83 and 84. On the other hand, gate number 67 controls the starting of the pulse generator. The pulses produced by the latter will be transmitted exclusively by means of gate number 83 to counter number 85 which will transmit a series of voltage steps by means of switch 86 (closed by activation of gate number 84) to one of the inputs of comparator 75. At the instant that the voltage at this input coincides with the voltage at the other input due to actuating switch number 6, it will transmit a pulse to gate number 76 which will deactivate flip-flop number 62, thus interrupting the operation of the pulse generator. Therefore, at this time, counter 85 will be stopped at output number 6, thus introducing a signal at the input of gate number 93 which determines that once a signal is received from the junction of gates 97, 98 and 81, a signal will be sent by the output or by command number 6. Releasing key number 6 activates flip-flop number 60 which, together with the deactivation of flip-flop number 60, produces a pulse at the output of gate number 73, which by means of gate number 59, passes to the modular pulse counter, activating the seventh module so that, at this moment, the sixth and seventh modules are activated.

What has been achieved up to now has been to operate on the programming unit 8,423, to program the value 973.4 in it, to indicate that this value is a maximum and that it is supposed to give response number 6. Therefore, the only thing that is lacking is to let it know to which parameter the value 973.4 corresponds. It is assumed that this value corresponds to temperature and temperature is represented by number 5 in the parameter input. It should be pointed out that, in the case of the parameters as well as that of the responses, only ten are included. However, this does not pose any limitation since, in this case, it would be sufficient to determine the corresponding parameter by pulsing a digit. In any other case, the number representing a desired parameter would be composed of various digits.

At this time, the system is ready to receive the information indicating the parameter which has been selected. To do this, key number 5 (temperature) is actuated. This action activates flip-flop number 62 and deactivates flip-flop number 60. This interrupts the signal which was being transmitted to the modular pulse counter. Thus, only module number 7, or its equivalent, flip-flop number 99, will be activated, sending these signals to gates 100 and 101. Moreover, activation of flip-flop number 62, deactivation of gate number 73 and elimination of the effects of contact bounce result in returning the pulse generator in service. These pulses will pass through gate 100 to counter 102 which will transmit a series of voltage pulses cyclically through switch number 103 (closed due to activation of gate 101) to comparator 75. The latter will send a pulse to gate number 76 at the instant that the voltage which it receives through the other input is equal to that which it receives from counter 102. In turn, gate number 76 will deactivate flip-flop number 62, the counter 102 interrupting operation of the pulse generator by means of gate number 67. This will occur in a position corresponding to output number 5 of said counter. Therefore, the input corresponding to temperature is selected.

Once the above is accomplished, key number 4 is released, thus activating flip-flop 60. Together with the deactivation of flip-flop number 62, which was accomplished previously, is activated gate number 73, thus sending a pulse through number 59 to the modular pulse counter, so that the first and seventh modules will be activated at this time. Gate number 104 will also be activated due to activation of the first module and of flip-flop number 99. Gate number 104 transmits a pulse through its output that activates flip-flop number 61. At the same time this pulse is received within the selection system (FIG. 1) by input FP which leads to deactivation of flip-flop number 41 and of flip-flop number 10 as well as activation of number 18. This deactivation of flip-flop number 41 interrupts the signal at terminal CP of FIG. 1 which produces an interruption of the signal at the same terminal of diagram 3. The latter causes deactivation of gate number 73, thus interrupting the signal transmitted to the modular pulse counter which at first leaves only the first module activated. However, the latter in turn becomes deactivated when gate number 57 becomes deactivated together with number 105. Therefore, number 47 of FIG. 5 remains activated. Moreover, deactivation of flip-flop number 10 of diagram 1 leaves the counters of decades 11, 11', 11" and 11'" deactivated so that the display of number 8,423 which represents the programming unit that was being operated on disappears from the screen, thus ending programming of this unit at this time.

It should be kept in mind that, at the moment that programming terminates, all of the modules of the modular pulse counter remain inactivated.

If, for any reason, it were desired to cancel the program which had been completed previously, this would be achieved in the same manner as had been the programming itself, with the sole difference that, instead of pressing on the keyboard of FIG. 3, a signal is introduced through terminal IPV of FIG. 3. This move would leave the programming unit deactivated and this program would be concluded through terminal FPV by deactivating the only module of the modular pulse counter which had been activated at the beginning. Since the comparator number 75 had not been activated, no pulse has been transmitted to the modular pulse counter. Because of this condition of deactivation, no signal would be present at output NP of the directional unit 69, thus cancelling any possibility of activation of the programming unit.

If, for any reason, it were necessary that the programming unit remained unprogrammed with respect to some types of response, all that would be necessary to do would be to impress a pulse on terminal SD of FIG. 3.

Following is a summary of the principles of operation of the programming procedure which has just been discussed: In the first place, the number of the programming unit on which an operation has been made (8,423) has been read into keyboard A of FIG. 1. This number has then been displayed on a screen. Following this step, a value of a given parameter or variable (973.4) has been read into keyboard B of FIG. 3. Then, on the same keyboard (keyboard B of FIG. 3), an indication has been made as to whether this value constitutes a maximum, minimum or an exact value. Immediately afterwards, and still employing keyboard B of FIG. 3, we have indicated the number that we would like to have the programming unit supply (in this case, response number 6). Finally, and still using the same keyboard, we have indicated the digit which represents the parameter of variable corresponding to the value that has been programmed. (For example, variable 5 would be that of temperature). Once all of these steps have been taken and the program has been completed, the number of the programming unit which had been selected (8,423) disappears from the display screen. Disappearance of this number from the screen indicates that the programming has ended.

Figure 2:
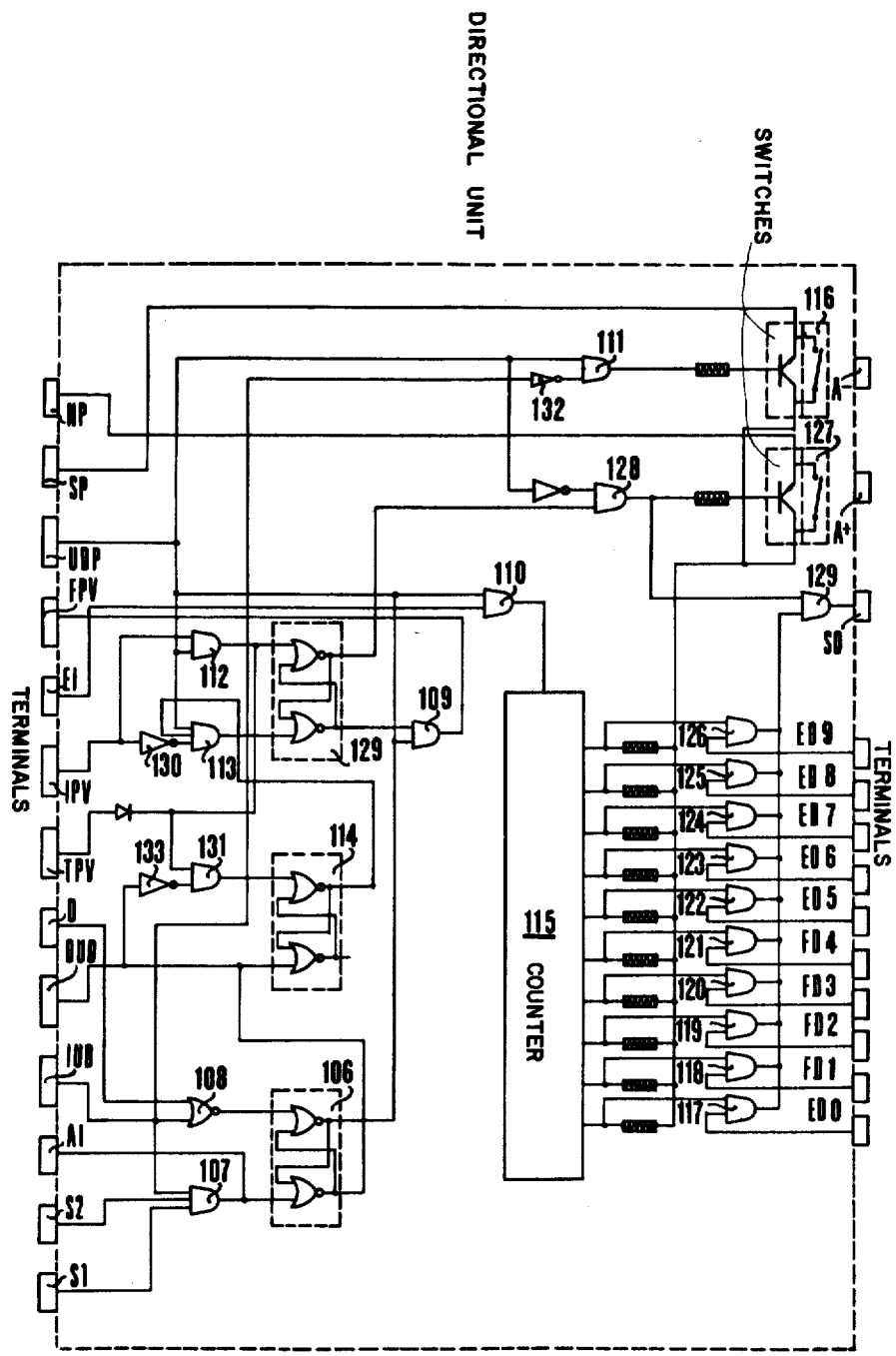
FIG. 2 is a schematic diagram of a directional unit.

An explanation of the principles of operation of the directional unit and which is shown on FIG. 2 is explained below. This unit includes a module of the modular pulse counter represented in FIG. 2 by flip-flop number 106 and gates 107 and 108. The principles of operation of the counter have been described previously. Let it be assumed that the directional unit whose operation is to be now described is the directional unit number 69 of FIG. 3. Upon beginning programming of the programming unit which includes this directional unit as the first unit, we have seen that it activated the first module of the modular pulse counter by way of gates 57 and 58 of FIG. 3 through input AI of FIG. 2 so that flip-flop 106 would be kept activated. This produces a signal at the inputs to gates 109, 110, 111, 112 and 113 as well as at output UDP of FIG. 2. (Due to deactivation of flip-flop number 106, number 114 was activated at the beginning and a signal was present at output DUD of FIG. 2).

When the circuit shown in FIG. 2 receives the pulses coming from the generator through input EI these pulses will pass on to gate number 110 and through this gate to decade counter 115. This decade counter will send a series of voltage pulses cyclically through switch number 116 which is activated by means of gate number 111. Gate number 111 in turn is activated by the activation of its corresponding module in the modular pulse counter due to the lack of a signal at output IUD of FIG. 2. These voltage pulses which are transmitted through switch number 116, pass on to terminals SP and from there to comparator number 75 of FIG. 3 as has been previously explained. Once the programming has been achieved by means of the procedure which was previously explained, a signal will be present at one of the outputs of decade counter 115. Therefore a given voltage pulse will pass through switch number 127 to terminal NP of the directional unit. Thus, there will be a voltage pulse present at this terminal which has been programmed by means of the keyboard, provided that gate number 128 and flip-flop number 129 are activated and that flip-flop number 106 is deactivated. Activation of flip-flop number 129 is achieved by means of gate number 113 provided that it has been programmed, that flip-flop number 114 has been activated during the programming procedure and that no signal has been present at input IPV of FIG. 2. This signal which exists at one of the outputs of the decade counter, in additional to creating a voltage pulse at terminal NP, supplies a signal to one of the inputs of gates 117 to 126 inclusive so that one of the digital inputs ED of FIG. 2 will have been selected. Therefore, when a signal is introduced in this manner through the digital input corresponding to the activated gate, it can activate gate number 129. In this case, a signal will be obtained at output SD of FIG. 2, provided, of course, that gate number 128 has been activated. (In all of the text in this application, an activated gate is to be understood to mean one which has an output signal). It will be observed that when there is no signal present at the inputs of gate number 108, it will deactivate flip-flop number 106. This effect is employed, as has been previously observed, when gates 57, 105 and 73 are deactivated at the end of the program. The first two gates eliminate the signal located at the right input to gate number 108 while the role of the last gate (number 73) is to interrupt the signal that is sent to the modular pulse counter. Therefore, it eliminates the signal which exists at terminal IUD, thus leaving all of the modules of modular pulse counter deactivated at the end of the entire program.

When it is desired that a certain programming unit shall not be actuated, what is done is to program the directional unit shown in FIG. 2 (the one located at the beginning of the programming unit) with an open circuit (unloaded). Once the first module of the modular pulse counter has been activated, or flip-flop number 106 has been activated (which is the equivalent), a pulse is transmitted from terminal IPV. This pulse deactivates gate number 113 by means of gate number 139 and in turn activates gate number 112 (since gate number 112 already had a signal present at its input which came from flip-flop number 106). When gate unber 112 becomes activated, flip-flop number 129 becomes deactivated. This action activates gate number 109 resulting in a signal at terminal FPV which indicates the end of the no-load program. The act of deactivating flip-flop number 129 has deactivated gate number 128 thus preventing switch 127 and gate number 129 from operating and therefore isolating this directional unit from the program.

When flip-flop number 129 is deactivated by means of gate number 112 (provided that flip-flop number 106 is activated), two signals will be present at the input to gate number 131 and this gate will deactivate flip-flop number 114. This prevents flip-flop number 129 from being activated in any case unless it has previously gone through a final programming stage in which flip-flop number 106 will be deactivated. The latter action will immediately activate number 114.

Switch number 116 will be closed only when there is no more than one module of the modular pulse counter activated due to gate number 132. Furthermore, there is another condition necessary for gate number 111 to become activated. This condition specifies that the module which is activated shall belong to the corresponding directional unit.

Gate number 133 prevents simultaneous presence of activating and deactivating signals at flip-flop number 114.

Having explained the operation of this series of large groups of components which compose the system in question, the system of data reading, both analog and digital is to be considered. It will be observed that at the NP outputs of the directional units of FIG. 3, there exist voltage pulses $\alpha$, $\beta$, $\gamma$ and $\delta$, referred to as $\phi$. These voltage pulses $\phi$, once divided by 1000, 100, 10 and 1, will be transmitted to adder 134 and from the latter to comparators 135 and 136 in such a matter that, upon receiving from these comparators the voltage resulting from the controlled process (reading of analog data), comparator number 135 for negative reading and comparator number 136 for positive reading, produce a signal at the output of comparator 135, provided that the voltage produced by the process is lower than that coming from the adder. Furthermore, a signal will be obtained at the output of comparator 136 (provided that the voltage is obtained from reading of analog data) that will be greater than the voltage coming from adder 134. When there is no signal present in either of the comparators so that the voltage to be controlled and the voltage issuing from the adder are assumed to be exactly equal, a signal appears at the ouput of gate number 137. Therefore, depending on the program which has been made, that is, on gates 97, 98 and 81 which have been activated, a signal at the common input to these gates will be obtained which will produce the response that has been previously programmed.

It must be considered that since the directional unit, which was previously described in FIG. 2, has an analog output (voltage steps) and a digital output, the reading of processed data may be performed directly by analog or digital means or else by using an analog-to-digital converter at the input.

Up to this point, the programming of each of the components which make up a programming unit could be performed by means of a series of voltage steps which are supplied by each of these components have been considered. However, this is nothing more than a specific form which was necessary to make the principles of operations explained before more easily understandable since it is possible to utilize, in addition to the voltage levels or, in place of them, the output signals which come directly from the decade counter. These outputs would be connected in parallel with each other and the group of these outputs would be connected to the appropriate key, that is, output number 3 of each decade counter or of each component of the programming unit would be connected to all outputs number 3 of the programming components which constitute the system being explained. In turn, each output number 3 would be connected to key number 3 of the programming keyboard. This would determine whether, when this key is actuated, the signal that would be received would decide that the decade counter was in this position and therefore, by means of the mechanism that has already been explained, would stop operation of the pulse generator. Thus, output number 3 of the component of the programming unit which has been selected at this moment is activated. Therefore, it can be seen that the system of transmitting voltage steps to a comparator is not the only system which the techniques described permit as a program pattern.

FIG. 2, which represents the directional units, shows a series of digital inputs which permit any type of multiplexing, particularly the type of multiplexing that has been defined by the selecting unit in FIG. 1. Actually, in general, there is no reason to have the number of digital inputs shown in this figure. This arrangement might be encountered in one of the complex systems using these techniques. Such a system would be an integration of all the circuitry that has been described or will be described throughout this explanation.

In FIG. 3, all the voltage levels have been included which are obtained from each directional unit, divided by given values, in accordance with the capacity of each programming unit. However, neither does this combination of levels include all the possibilities for signal comparison (programmed and processed) permitted by this system of processing and programming multiple signals but does illustrate the fact that there are many forms of performing such comparisons.

Another one of these forms, which is to be mentioned is "level by level" comparison, that is, comparison of each level coming from a different directional unit with a series of levels which are stored at different terminals (or in a multiplex unit) and which are derived from the process to be controlled. With these suggestions, a practical example has been set out in this application, although it could not encompass all of the technology.

Since a complete explanation has been made of the process for programming units of non-repetitive commands, of sequentially repetitive commands, or of nonsequential nonrepetitive commands, the operation of the system is now to be explained. The operation of the system which is described for those cases in which each programming unit must respond to a highly repetitive form within each cycle and in a nonsequential form. It is necessary to repeat that what is going to be described below is not the operation of a system applied to highly repetitive operations, but rather operation of the system which is being explained as applied to those equipments which require a large repetition of non-sequential commands.

In these cases, programming can be performed in two forms. In the first place, it can be achieved in the form that has already been explained but, among the multitude of responses admissible per cycle, having several connected in parallel, which would result in obtaining a given invariable response of various programming units and of different values of the independent variable or parameter for which the same response (dependent variable or function) is obtained.

Another form of performing programming of this type with the same system will be described below with respect to FIG. 4. Decade counters 140, 141 and 142 will cause three signals to appear at outputs a, b and c of Figure number 4 by way of outputs 143, 144 and 145 in the manner described in Figure number 1. This will be accomplished through gates 146 to 175 inclusive. These three signals are present at the resistors of the upper left portion of the memory units located within the circles drawn in Figure number 4. (These memory units have been drawn to show that they operate together. In this particular case, the memory capacity can easily amount to one million bits). Since in this case a fraction of the memory with a capacity of 1,000 bits has been described, when signals are introduced by terminals S1, S2 and S3, in addition to the three signals emanating from the group of terminals a, b and c and since terminal 176 or terminal CP (since either of these two possibilities is valid) is activated at the beginning of the programming procedure, the voltage at the terminals of the corresponding diode will have increased in such a manner that it will have exceeded the peak voltage of this diode. Therefore, when these signals disappear and the voltage at the terminals of the tunnel diode therefore becomes stabilized at a value higher than that which it would have had in case such activation had not existed, this diode will be programmed in such a manner that the voltage or trigger threshold of transistors 177 will decrease. Therefore, these transistors would accept the signal coming from terminal P, provided that this threshold would terminate with the presence of the signals at the terminals of the resistors located in the upper right part of the circles drawn in FIG. 4 which come from terminals S4, S5, S6 and S7 in addition to the signals coming from terminal groups a', b' and c'. These terminal groups are associated with one of the many types of memory sweep that can be employed by the system and which count the pulses received by terminal number 181. When this pulse counter consisting of decade counters 178, 179 and 180 (three decade counters are mentioned since we are dealing with a memory of 1,000 bits, but in no case is any limitation implied) has a number represented at its terminals a', b', and c' which in turn represents a programmed memory unit, this memory will accept a pulse through terminal P. If this pulse retains or compares the voltage levels which are present at this moment at terminals 182, 183 and 184, the value of the parameter that was programmed will have been determined. Thus, by following this procedure, it is possible to program a given response in each and every one of the possibilities composing the memory shown in FIG. 4 which is described here. Therefore, a command may be repeated whenever desired, as many times as it may be desired and be limited only by the number of possibilities or bits of memory which are available in each case.

The type of employment of the techniques which are described here therefore permits storage, retrieval and variation of all kinds of information. Storage of information would be performed by introducing words and numbers into this memory simply by dividing the number of bits of each memory unit by the number of bits required to express all the numbers, letters and conventional signs which are commonly used. Introduction of this information would be achieved by means of the multiplexing process performed by the decade counters 140, 141 and 142 (in this particular case). These counters select the memory units indicated within the circles of FIG. 4 in sequence and by the procedure which has been explained. At the same time, they continuously indicate (this indication serves the purpose of deciding whether this memory unit should be programmed or not) which memory unit is being operated on. This determines whether or not information is to be fed in by means of the keyboard. The manner in which these decade counters 140, 141 and 142 indicate which memory unit is being operated on is by using the outputs which are activated within these counters or else by means of the voltage steps or levels which are constantly present at terminals 143, 144 or 145. These voltage steps are conveniently selected by the switches whose operation has already been explained in connection with the appropriate figures. Therefore, once it is known which memory unit is being operated on, the decision can be made as to whether to program it or not. If it is desired to program it, all that is necessary to do is to transmit the signal by way of terminal CP of FIG. 4 which therefore would program the memory unit that, at this moment, would have all the necessary signals present at the inputs of the resistors located at the upper left portion of each circle of FIG. 4.

Figure number 4 shows a memory bank of 1,000 bits and presents in detail two memory units, namely number 964 and 073. These numbers have been determined by the connections of the terminals of the memory units to each one of decade counters 140, 141, 142 and in turn to 178, 179 and 180.

Figure 4:
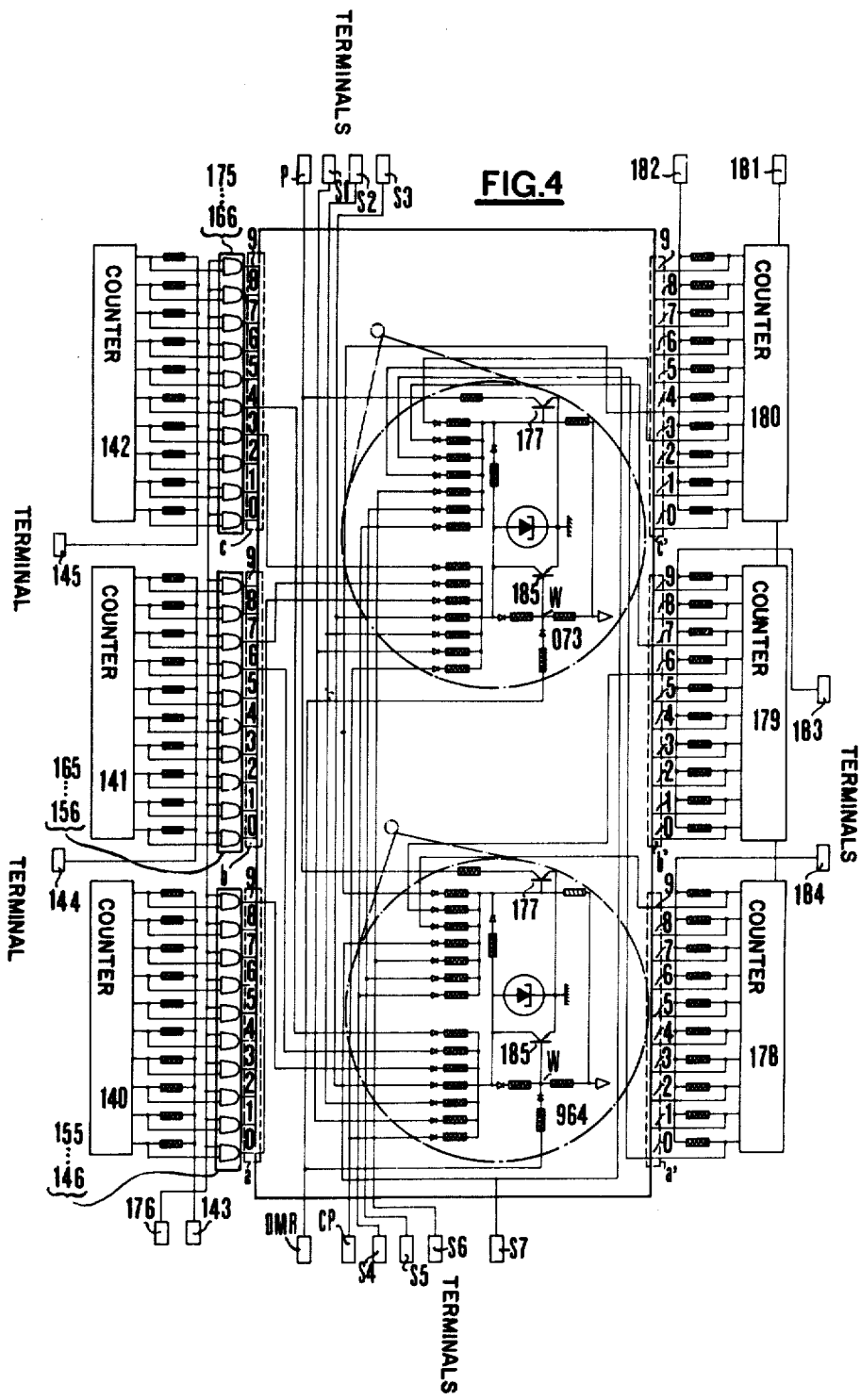
FIG. 4 is a schematic diagram of a memory unit.

If, in some particular case, information stored in each memory unit of FIG. 4 (which the tunnel diode converts from state 1 to state 0) were to be lost, it would be perfectly possible to recover it since there is the possibility that, instead of two groups of resistors within each memory unit (one group is located in the upper left portion and the other group is located in the upper right portion), there is only one group, or possibly two groups as in the case of FIG. 4 but the decade counters located in the upper portion of the figure are operating synchronously with those located in the lower portion of this figure. Once the information is retrieved from each memory unit, there exists the possibility that it may be replaced automatically through the same terminal CP. This action of restoring the information takes place when a pulse is transmitted through terminal CP provided that terminal P will accept a signal.

In those cases where it is necessary to eliminate information from any memory unit, this will be performed in the following manner: Decade counters 140, 141 and 142 will select a given position in the memory unit and a signal will be introduced through terminal CP of FIG. 4. This action will cause the voltage at the terminals of the tunnel diode of the corresponding memory unit to exceed the peak voltage corresponding to this diode, thus changing it to state 1. However, if a signal is also introduced at terminal DMR of FIG. 4, the voltage at point W of FIG. 4 will be increased, thus triggering transistor 185. The voltage at the terminals of the tunnel diode will then go to zero. Therefore, this unit will be deactivated when the signals selected by deprogrammed memory unit are interrupted.

Thus, FIG. 4 depicts a memory unit of 1,000 bits which permits storing within it information regarding the commands that the programming unit should supply. Although Figure number 4 shows a memory unit having a capacity of 1,000 bits, this does not constitute a limiting condition since each memory unit (units 964 and 073) have been planned in such a manner that memory units similar to those described in FIG. 4 can be added to it in order to attain the desired memory capacity.

With respect to the explanations given in FIG. 4 and to the manner of obtaining access to each memory unit for programming as well as deprogramming, we have discussed an access system and a system for exploring the memory which is the technique that was described at the beginning. However, even within the scope of these techniques and depending on the application of each memory, there is a series of variations in the procedure for programming and deprogramming as well as in memory exploration. The programming and deprogramming procedures can be performed in the manner that has been described in connection with FIG. 4 and which, in turn, is the same as that described for FIG. 1. However, they may be carried on by means of sweeping or exploring each one of the memory elements (964,073), depositing information (state 1) in the appropriate memory units. This manner of conducting the programming would be employed when decade counters 140, 141 and 142, which explore the memory, indicate through their outputs or terminals 143, 144 and 145 that operations are being conducted on the memory unit that is appropriate to the program.

With respect to exploration of the memory, a valid process for those programmers whose basic parameter, namely time, utilize a procedure of pulse counting by means of decade counters 178, 179 and 180 has been described. This even serves for a periodic exploration of the memory which would retrieve all of the information stored within it.

Another possibility of exploring the memory which is being determined is that in which terminals a', b' and c' are supplied with the signals emitted by an analog-to-digital converter, which may or may not be in a multiplexed form. The memory which is thus determined will now respond to values of the parameter in an analog form that will be transmitted to the analog-to-digital converter.

Therefore, as examples, some of the possibilities of access to the memory shown in Figure number 4 have been mentioned. Application of the system described to those cases, in which it is necessary that each programming unit respond in a repetitive and non-sequential manner, have been discussed. The case of response of the memory unit of FIG. 4 to given stimulus is reduced to the acceptance of a signal through terminal P of FIG. 4.

It should be noted that these two procedures for employing the same technique for solving problems of repetitive and non-repetitive commands as well as of commands that are repeated sequentially or rarely repeated are not exclusive per se. That is, a system of processing and programming of multiple parameters such as described above will include all of the possibilities mentioned previously during the course of the description.

While the nature of the invention as well as the manner and an embodiment for applying it to practice have been described, it is to be understood that numerous other embodiments and variants are possible. The details of the abovementioned arrangements may be changed without departing from the spirit and scope of the invention, its scope being defined by the appended claims.

I claim:

1. A programmable multiple parameter process controller comprises a plurality of programmable units, for monitoring the relationship between a pre-selected parameter and a preselected value for that parameter and producing a pre-selected output upon the occurence of the pre-selected condition, comprising:
   (a) means for selecting a desired programmable unit from said plurality of programmable units contained in said process controller;
   (b) means for generating and storing a desired parameter target value in said selected programmable unit;
   (c) means for generating and storing a pre-selected conditional value in said selected programmable unit;
   (d) means for generating and storing in said selected programmable unit a signal representative of said pre-selected output;
   (e) means for selecting one of said plurality of parameters to be monitored;
   (f) means for monitoring the value of said selected parameter and comparing said value to said target value stored in said selected programmable unit to produce a signal representative of the relationship of said parameter value to said target value; and
   (g) means for comparing the value of said representative signal to said pre-selected conditional value stored in said selected programmable unit and generating said pre-selected output in response thereto.

2. The process controller of claim 1, wherein said means for selecting the desired programmable unit includes a source of voltage and a keyboard connected to said source of voltage, said keyboard comprising a plurality of pushbuttons, the depression of each of which generates a different voltage signal and comprises:
   (a) pulse generator means activated by said voltage signal from said keyboard for generating a plurality of voltage steps of different amplitudes;
   (b) a plurality of counting means, one of which is activated by said generated voltage steps from said pulse generator means to cyclically conduct said plurality of voltage steps through its outputs;
   (c) comparator means connected to receive said different voltage signal generated by said keyboard and said cyclically conducted plurality of voltage steps from said one of said plurality of counting means and to produce a comparator signal when said two voltage signals are equal; and
   (d) means connected between said comparator means and said plurality of counting means for deactivating said activated one of said plurality of counting means and said pulse generator means upon receiving said comparator signal, whereby said deactivated one of said plurality of counting means contains a step voltage indicative of said desired programmable unit.

3. The process controller of claim 2, further comprising logic means for activating a different one of said plurality of counting means upon determining that said previously activated counting means has been deactivated.

4. The process controller of claim 3, further comprising a plurality of pulse counter modules connected between said keyboard and said plurality of counting means such that each succeeding one of said plurality of pulse generator means in turn, whereby the depression of a succession of push-buttons of said keyboard produces in said plurality of counting means a plurality of step voltages for selecting said desired programmable unit.

5. The process controller of claim 4, further including means connected to said plurality of counting means for displaying a number indicating the selected programmable unit.

6. The process controller of claim 2, wherein each of said counting means comprises a decade counter.

7. The process controller of claim 3, wherein said logic means comprises flip-flops.

8. The process controller of claim 4, wherein each of said pulse counter modules comprises a flip-flop.

9. The process controller of claim 1, wherein said means for generating and storing said parameter target value includes a source of voltage and a keyboard connected to said source of voltage, said keyboard comprising a plurality of push-buttons, the depression of each of which generates a different voltage signal, and comprises:

(a) a plurality of directional units, one of which is activated by said voltage signal from said keyboard;
(b) pulse generator means activated by said voltage signal from said keyboard for generating a plurality of voltage steps of different amplitudes;
(c) a plurality of voltage step generators, one contained in each of said plurality of direction units for generating from said pulse generator voltage steps a plurality of cyclically conducted voltage steps through its outputs;
(d) comparator means connected to receive said different voltage signal generated by said keyboard and said plurality of cyclically conducted voltage steps from said activated one of said plurality of directional units and to produce a comparator signal when said two voltate signals are equal; and
(e) means connected between said comparator means and said plurality of directional units for deactivating said activated one of said plurality of directional units and said pulse generator upon receiving said comparator signal;
whereby said deactivated one of said plurality of directional units contains a step voltage indicative of said parameter target value.

10. The process controller of claim 9, further including logic means for activating a different one of said plurality of directional units upon determining that said previously activated directional unit has been deactivated.

11. The process controller of claim 10, further including a plurality of counter modules connected between said keyboard and said plurality of directional units such that each succeeding one of said plurality of directional units is connected
to said keyboard and said pulse generator means in turn, whereby the depression of a succession of pushbuttons of said keyboard produces in said plurality of directional units a plurality of step voltages indicative of said parameter target value.

12. The process controller of claim 11, wherein each of said pulse counter modules comprises a flip-flop.

13. The process controller of claim 10, wherein said logic means comprises flip-flops.

14. The process controller of claim 9, wherein each of said plurality of said direction units contains one of a plurality of pulse counter modules connected to said keyboard for activating its respective one of said plurality of directional units.

15. The process controller of claim 14, wherein each of said pulse counter modules comprises a flip-flop.

16. The process of claim 9, wherein each one of said plurality of step voltage generators comprises a decade counter.

17. The process controller of claim 1, wherein said means for generating and storing a pre-selected conditional value includes a source of voltage and a keyboard connected to said source of voltage, said keyboard comprising a plurality of push-buttons, the depression of which generates a different voltage signal, and comprises:

(a) pulse generator means activated by said voltage signal from said keyboard for generating a plurality of voltage steps of different amplitudes;
(b) counting means activated by said generated voltage steps from said pulse generator means for cyclically conducting said plurality of voltage steps through its outputs;
(c) comparator means connected to receive said different voltage signal generated by said keyboard and said cyclically conducted plurality of voltage steps from said counter means and to produce a comparator signal when said two voltage signals are equal; and
(d) means connected between said comparator means and said counting means for deactivating said counting means and said pulse generator means upon receiving said comparator signal,
whereby said deactivated counter means contains a step voltage indicative of said pre-selected conditional value.

18. The process controller of claim 17, wherein said counting means comprises a three-state counter.

19. The process controller of claim 17, further comprising a pulse counter module connected between said keyboard and said counting means for activating said pulse generator means and permitting activation of said counting means.

20. The process controller of claim 19, wherein each of said pulse counter modules comprises a flip-flop.

21. The process controller of claim 1, wherein said means for generating and storing said representative preselected output signal includes a source of voltage and a keyboard connected to said source of voltage, said keyboard comprising a plurality of push-buttons, the depression of which generates a different voltage signal, and comprises:

(a) pulse generator means activated by said voltage signal from said keyboard for generating a plurality of voltage steps of different amplitudes;
(b) counting means activated by said generated plurality of voltage steps from said pulse generator means for cyclically conducting said plurality of voltage steps through its outputs;
(c) comparator means connected to receive said different voltage signal generated by said keyboard and said cyclically conducted plurality of voltage steps from said counting means and to produce a comparator signal when said two voltage signals are equal; and
(d) means connected between said comparator means and said counting means for deactivating said counting means and said pulse generator means upon receiving said comparator signal,
whereby said deactivated signal means controls a step voltage indicative of said pre-selected output signal.

22. The process controller of claim 2, further comprising a pulse counter module connected between said keyboard and said counting means for activating said pulse generator means and permitting activation of said counting means.

23. The process controller of claim 21, wherein each of said counting means comprises a decade counter.

24. The process controller of claim 22, wherein each of said pulse counter modules comprises a flip-flop.

25. The process controller of claim 1, wherein said means for selecting one of said plurality of parameters to be monitored includes a source of voltage and a keyboard connected to said source of voltage, said keyboard comprising a plurality of push-buttons, the depression of which generates a different voltage signal, and comprises:
- (a) pulse generator means activated by said voltage signal from said keyboard for generating a plurality of voltage steps of different amplitudes;
- (b) counting means activated by said generated plurality of voltage steps from said pulse means for cyclically conducting said plurality of voltage steps through its outputs;
- (c) comparator means connected to receive said different voltage sigbal generated by said keyboard and said cyclically conducted plurality of voltage steps from said counting means and to produce a comparator signal when said two voltage signals are equal; and
- (d) means connected between said comparator means and said counting means for deactivating said counting means and said pulse generator means upon receiving said comparator signal, whereby said deactivated counting eans contains a step voltage indicative of said selected parameter to be monitored.

26. The process controller of claim 25, further comprising a pulse counter module connected between said keyboard and said counting means for activating said pulse generator means and permitting activation of said counting means.

27. The process controller of claim 25, wherein each of said counting means comprises a decade counter.

28. The process controller of claim 26, wherein each of said pulse counter modules comprises a flip-flop.

29. A method of operating a programmable multiple parameter process controller which comprises a plurality of programmable units, each for monitoring the relationship between a pre-selected parameter and a pre-selected target value for that parameter; and producing a pre-selected output upon the occurence of a pre-selected condition, comprising the steps of:
- (a) selecting the desired programmable unit from said plurality of programmable units contained in said process controller;
- (b) generating and storing a desired parameter target value in said selected programmable unit;
- (c) generating and storing a pre-selected conditional value in said selected programmable unit;
- (d) generating and storing in said selected programmable unit a signal representative of said pre-selected output;
- (e) selecting one of said plurality of parameters to be monitored;
- (f) monitoring the value of said selected parameter and comparing said value to said target value stored in said selected programmable unit to produce a signal representative of the relationship of said parameter value to said target value; and
- (g) comparing the value of said representative signal to said pre-selected conditional value stored in said selected programmable unit and generating said pre-selected output signal in response thereto.

* * * * *